(12) United States Patent
Jeske

(10) Patent No.: US 8,931,279 B2
(45) Date of Patent: Jan. 13, 2015

(54) SWITCHABLE SOLAR HEATING DEVICE FOR A GAS TURBINE

(75) Inventor: Hans-Otto Jeske, Wesel (DE)

(73) Assignee: Man Diesel & Turbo SE, Augsburg (DE)

( * ) Notice: Subject to any disclaimer, the term of this patent is extended or adjusted under 35 U.S.C. 154(b) by 867 days.

(21) Appl. No.: 13/140,075

(22) PCT Filed: Oct. 23, 2009

(86) PCT No.: PCT/DE2009/050059
§ 371 (c)(1),
(2), (4) Date: Jun. 16, 2011

(87) PCT Pub. No.: WO2010/075854
PCT Pub. Date: Jul. 8, 2010

(65) Prior Publication Data
US 2011/0314822 A1  Dec. 29, 2011

(30) Foreign Application Priority Data
Dec. 16, 2008 (DE) .......................... 10 2008 062 455

(51) Int. Cl.
*F01D 17/14* (2006.01)
*F02C 1/05* (2006.01)
*F03G 6/06* (2006.01)
*F16K 11/085* (2006.01)

(52) U.S. Cl.
CPC ............... *F02C 1/05* (2013.01); *F01D 17/148* (2013.01); *F03G 6/064* (2013.01); *F16K 11/0853* (2013.01); *Y02E 10/46* (2013.01)
USPC ........................ 60/736; 60/682; 137/625.46

(58) Field of Classification Search
CPC .......... F01D 17/14; F01D 17/148; F02C 1/05; F03G 6/06; F03G 6/064; F16K 11/085; F16K 11/0853; Y02E 10/46
USPC .................... 60/734, 736, 739, 741, 742, 682; 251/208; 137/625.43, 625.46, 625.47
See application file for complete search history.

(56) References Cited

U.S. PATENT DOCUMENTS

| 2,442,019 | A |   | 5/1948 | Ray |
|---|---|---|---|---|
| 3,191,628 | A | * | 6/1965 | Kirkwood et al. ........ 137/625.43 |
| 4,167,856 | A | * | 9/1979 | Seidel et al. ............... 60/641.14 |
| 4,259,836 | A | * | 4/1981 | Finckh ............................ 60/802 |
| 4,284,063 | A | * | 8/1981 | Watson .......................... 126/582 |
| 4,566,628 | A |   | 1/1986 | Latarius |
| 5,417,052 | A | * | 5/1995 | Bharathan et al. .............. 60/783 |
| 6,141,949 | A |   | 11/2000 | Steinmann |
| 7,950,376 | B2 | * | 5/2011 | Rollet ....................... 123/568.12 |
| 2002/0148227 | A1 |   | 10/2002 | Mackay |

FOREIGN PATENT DOCUMENTS

| DE | 2948306 | 6/1981 |
|---|---|---|
| DE | 19651645 | 6/1998 |

(Continued)

*Primary Examiner* — J. Gregory Pickett
(74) *Attorney, Agent, or Firm* — Cozen O'Connor

(57) ABSTRACT

A switchable solar heating device for a gas turbine with a compressor, having a valve for electively bypassing a solar heater arranged between a compressor stage and a turbine stage of the gas turbine. The valve is constructed as a 4-way valve with a compressor port that can be connected to the compressor stage, a turbine port that can be connected to the turbine stage, a solar input port that can be connected to an input of the solar heater, and a solar output port that can be connected to an output of the solar heater.

11 Claims, 2 Drawing Sheets

(56) References Cited

FOREIGN PATENT DOCUMENTS

| | | |
|---|---|---|
| EP | 1355095 | 10/2003 |
| JP | 05-71252 | 3/1993 |
| JP | 06-323500 | 11/1994 |
| JP | 2006-110937 | 4/2006 |

* cited by examiner

8,931,279 B2

SWITCHABLE SOLAR HEATING DEVICE FOR A GAS TURBINE

PRIORITY CLAIM

This is a U.S. national stage of Application No. PCT/DE20091050059, filed on Oct. 23, 2009, which claims priority to German Application No: 10 2008 062 455.1, filed: Dec. 16, 2008, the contents of which are incorporated herein by reference.

BACKGROUND OF THE INVENTION

1. Field of the Invention

The invention is directed to a switchable solar heating device for a gas turbine with at least one compressor stage and at least one turbine stage and to a gas turbine having a switchable solar heating device of this kind.

2. Related Art

In the turbine stages of a gas turbine, entropy of a gas is converted into mechanical energy. Prior to this, the entropy of the gas is correspondingly increased by one or more compression steps in a compressor and combustion of a fuel.

For example, DE 29 48 306 C2 and DE 196 51 645 C2 disclose an additional switchable solar heating device by which the gas can be preheated by a solar heater before being fed to a combustion chamber. Fuel is sprayed into this combustion chamber and the occurring mixture of fuel and compressed, preheated gas is burned. In this way, the entropy of the gas can be increased in an environmentally friendly way by solar energy and the performance of the gas turbine is accordingly increased, or its fuel consumption is decreased, so as to reduce the environmental burden.

In order to bypass the solar heating device and guide the gas directly from the compressor to the turbine under unfavorable climatic conditions in which efficient use of the solar heating device is not possible or for maintenance and repair work without high pressure losses in the solar heating device due to long pipelines, DE 196 51 645 C2 provides two separate 3/2-way valves upstream and downstream of the solar heating device which connect the compressor and turbine electively via the solar heating device or a bypass. In DE 29 48 306 C2, three 2/2-way valves are arranged for this purpose in the inlet and outlet of the solar heating device and the bypass. Both solutions require a relatively high expenditure on construction and control technology and disadvantageously increase pressure losses in the gas.

SUMMARY OF THE INVENTION

It is an object of the present invention to improve a gas turbine with a switchable solar heating device and to mitigate at least one of the above-mentioned disadvantages.

A gas turbine according to one embodiment of the invention has one or more compressor stages for compressing a gas and one or more turbine stages for converting the entropy of the gas into mechanical power. A solar heater is arranged between at least one, preferably final, compressor stage and at least one, preferably first, turbine stage of the gas turbine. A solar heater generally comprises one or more solar heaters in which the gas is heated by solar energy. This can be carried out directly, for example, in that the gas is guided through a preferably long passage, e.g., having multiple turns, whose walls are heated by solar radiation. Indirect solar heaters in which, for example, a heat exchanger medium is heated by solar radiation and subsequently gives off heat to the gas or in which the gas is heated electrically by current generated in solar cells are also equally possible. Indirectly operating solar heaters of this kind can advantageously permit an optimal positioning of the surfaces for capturing the solar radiation or an intermediate storing of solar energy.

During unfavorable climatic conditions, particularly when the sky is overcast or at night, the gas can be heated by the solar heater only to a limited extent. On the other hand, the fluid passages of the solar heater through which gas circulates and which are usually long with large surfaces for improving heat exchange disadvantageously give rise to pressure losses and heat losses in the gas before it enters the turbine stage. In order to prevent this loss of entropy, a valve is provided by which the solar heater can be electively bypassed and the gas can be conducted from the compressor stage to the turbine stage without flowing through the solar heater.

According to one embodiment of the invention, this valve is constructed as a 4-way valve and therefore has four ports: a compressor port that can be connected to the compressor stage, a turbine port that can be connected to the turbine stage, a solar input port that can be connected to an input of the solar heater, and a solar output port that can be connected to an output of the solar heater.

A 4-way valve of this type allows the compressor port to be connected to the solar input port and the solar output port to be connected to the turbine port in a first switching position so that gas can flow from the compressor through the solar heater, undergo solar heating therein, and then flow into the turbine stage. In a second switching position, the valve connects the compressor port to the turbine port and accordingly makes it possible for gas to flow from the compressor to the turbine stage without flowing through the solar heater.

In one or both switching positions, a flow can be permitted between the ports of the valve that are not connected. However, in the first switching position the compressor port is preferably closed off from the turbine port and/or the solar input port is closed off from the solar output port; in the second switching position, the compressor port is preferably closed off from the solar input port and the solar output port is preferably closed off from the turbine port so that substantially all of the gas flows from the compressor through the solar heater in the first switching position and bypasses the solar heater in the second switching position. In the second switching position, the solar input port and solar output port are preferably connected to one another so that the four ports are alternately connected to one another in the manner of a railroad slip switch, and a closed circuit which is separate from the gas turbine is formed with the solar heater.

Compared to the known solutions with two or more 2-way valves or 3-way valves, a 4-way valve of this type advantageously lowers costs for construction and switching apparatus and reduces the pressure loss that increases with each additional valve.

In particular, however, a 4-way valve according to one embodiment of the invention can reduce pressure losses and fluid hammers that occur when switching between the first switching position and second switching position because two ports in each instance are alternately connected in the manner of a slip switch, whereas in the known 2-way or 3-way valves one port is completely closed off causing reverse flows. When switching from the first switching position to the second switching position, for example, the gas, which has just flowed through the solar heater, can flow once again into the solar heater in a circuit through the connection between the solar output port and solar input port. On the other hand, in a 2-way valve or 3-way valve the flow comes to an abrupt stop at the blocked port, which leads to fluid hammers in the solar heater and high stressing of the valve. In addition, the gas flowing further in a circuit through the solar input port, the solar heater and the solar output port in the second switching position advantageously retains its kinetic energy, apart from friction losses and deflection losses, so that lower accelerations of the gas occur when switching back abruptly into the first switching position and, in turn, fluid hammers can accordingly be reduced.

A 4-way valve according to one embodiment of the invention can have the further advantage that clogging or sticking of completely blocked ports such as occurs when 2-way valves or 3-way valves are seldom switched can be prevented in a preferred embodiment when every port is constantly connected to another port.

In a preferred embodiment, the valve is switchable into at least one third switching position in which the compressor port is connected to the solar input port and the turbine port, and the solar output port is likewise connected to the turbine port. Therefore, the gas coming from the compressor stage can flow out of the compressor port and, depending on the position of the valve and the pressure conditions and temperature conditions, can flow partially into the solar input port and, therefore, into the solar heater or directly into the turbine port. In this way, deliberately only a portion of the gas can be subjected to solar heating in a mixed operation.

For this purpose, the hydraulic diameter of the compressor port, solar input port, solar output port and/or turbine port can vary in different third switching positions in order to vary the proportioning of the gas into solar heated gas and gas guided directly to the turbine. In this way, discrete third switching positions or a continuous variation of hydraulic diameters can be provided. In an advantageous further development, the solar input port is closed off from the solar output port in at least one of the third switching positions to prevent secondary flows within the solar heater.

In a preferred embodiment, an adjustable flap is rotatably arranged in the valve for switching the valve. This can allow a structurally simple and robust solution, a good sealing or a simple control, for example, by an electric rotary motor.

As an alternative to a construction in which one or more third switching positions can be selected, the valve can also be constructed as a 4/2-way valve. As is conventional, a "x/y-way valve" in the following designates a valve with x ports and y switching positions defined by the connection of individual ports. Accordingly, a 4/2-way valve, for example, designates a valve with four ports and exactly two selectable switching positions, a first and a second. Valves with only two defined switching positions can be constructed in a structurally simpler and more reliable manner.

In a particularly preferred construction, the compressor port and turbine port enclose an angle with one another in the range of about 45° to about 135°, preferably substantially 90°.

In a gas turbine according to the prior art such as is shown in FIG. 1, the gas flows radially out of the compressor 1 and radially into the high-pressure turbine 3A. For this purpose, the gas is deflected by 90° following the compressor 1 in an elbow 40 and is fed to an external combustion chamber 2 from which it enters the high-pressure turbine 3A after the addition of fuel and combustion of the gas/fuel mixture. When the compressor port and turbine port enclose an angle with one another in the range of about 45° to 135°, particularly substantially 90°, this valve can be installed instead of the conventional elbow 40. This facilitates retrofitting of existing gas turbines with a switchable solar heating device and, further, affords optimal space for the arrangement of the bypassable solar heater in the angular range complementary to the angle (upper left in FIG. 1) enclosed between the compressor port and turbine port. The compressor port and solar input port, solar input port and solar output port, and/or solar output port and turbine port also advantageously enclose an angle with one another, respectively, in the range of about 45° to approximately 135°, preferably substantially 90°. The center lines of these four ports all preferably lie in substantially the same plane.

For reasons pertaining to design and technical reasons relating to maintenance and repair, it can be advantageous to provide one or more external combustion chambers between a compressor stage and a turbine stage which are arranged outside a gas turbine housing. In a preferred embodiment, at least one external combustion chamber of this type is arranged between the turbine port and the turbine stage so that the gas is first preheated by the solar heater and is subsequently further heated in the combustion chamber by combustion of fuel. In addition or alternatively, it is also possible to provide one or more external combustion chambers upstream of and/or inside the solar heater. In particular, combustion chambers arranged between the solar input port and solar output port are electively bypassed together with the solar heater by the 4-way valve.

The solar heater arranged between the solar output port and the solar input port can have a plurality of solar heaters. These solar heaters may differ in output, structural shape and the like. For example, a direct solar heater in which the gas is preheated by heat exchange with walls heated by solar radiation and an adjoining indirect solar heater in which the gas is additionally heated by current obtained from solar cells can be provided.

In addition or alternatively, one or more solar heaters can also be arranged between the compressor stage and the compressor port and/or between the turbine port and the turbine stage, i.e., upstream and/or downstream of the solar heater, which can be bypassed by means of the valve. For example, a direct solar heater which often requires a long gas passage for sufficient heat exchange, but which therefore also causes corresponding friction losses and—in the absence of solar energy—heat losses, can be arranged in the bypassable solar heater; an indirect additional solar heater in the form of an immersion heater operated by solar current which generates fewer pressure losses and heat losses can be arranged after the bypassable solar heater directly in front of the combustion chamber in order to minimize the heat losses on the way to the combustion chamber.

As was stated above, a 4-way valve according to one embodiment of the invention between the compressor stage and the turbine stage advantageously makes it possible to realize the elective bypassing of the solar heater arranged between the compressor stage and turbine stage by only one valve.

The solar heater can be turned on and off manually or automatically, for example, particularly by a control device that adjusts the valve to the first switching position, second switching position or, as the case may be, a third switching position depending on a heating output of the solar heating device.

BRIEF DESCRIPTION OF DRAWINGS

Further advantages and features are indicated in the subclaims and the embodiment examples. The partially schematic drawings show:

DETAILED DESCRIPTION OF THE PREFERRED EMBODIMENTS

Figure 1:
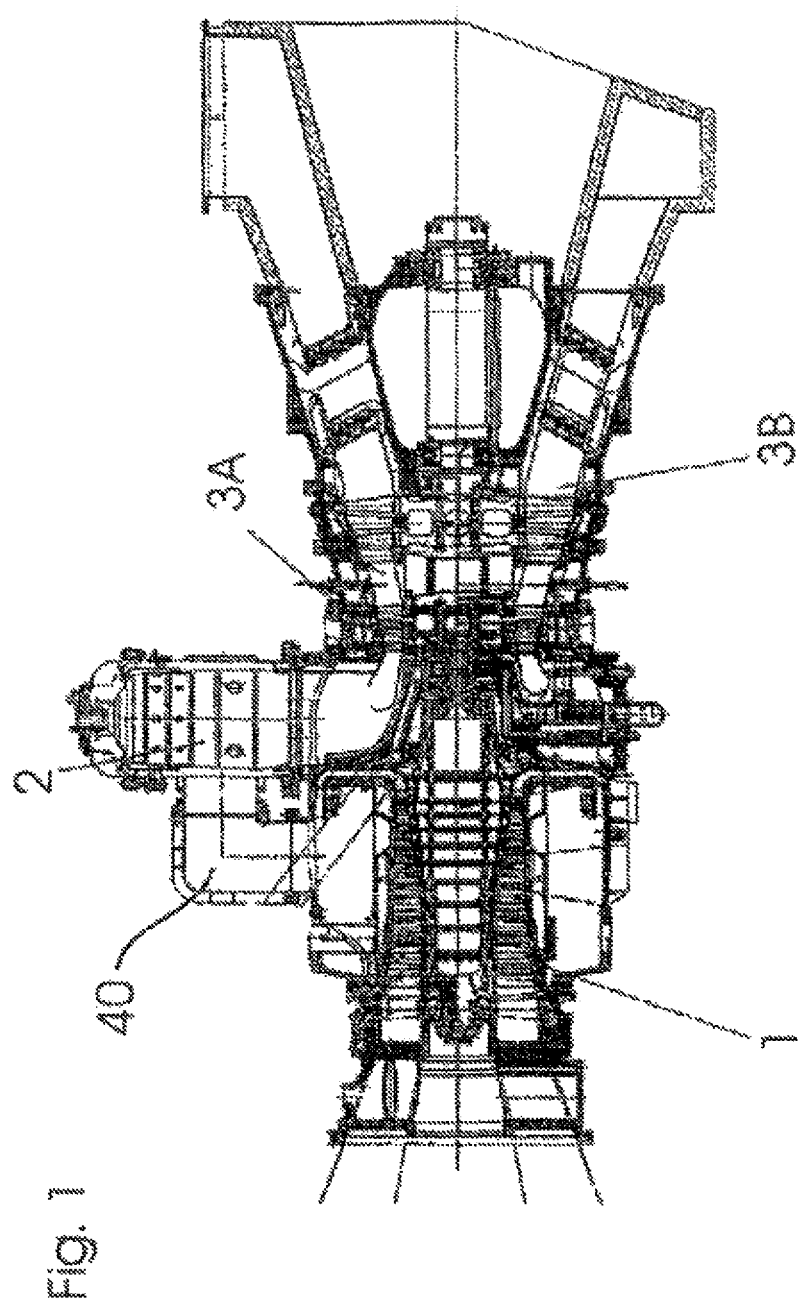
FIG. 1 is a gas turbine according to the prior art before a modification according to the invention, in longitudinal section.

FIG. 1 shows a gas turbine according to the prior art in longitudinal section. As was mentioned above, gas is compressed in a multistage compressor 1 and subsequently deflected by 90° in an elbow 40 before entering an external combustion chamber 2. Fuel is added to this gas in the combustion chamber 2 and the gas/fuel mixture is burned. The hot exhaust gas enters the high-pressure turbine 3A radially and from the latter enters the adjoining free power turbine 3B in which a portion of its entropy is converted into mechanical work which is used partly for driving the compressor 1 running on the same shaft and partly for driving a generator or the like (not shown).

An existing gas turbine of this kind can be retrofitted to form a gas turbine according to the invention by replacing the elbow 40 with a switchable solar heating device according to an embodiment of the present invention. Therefore, solar heating devices of this type will be described in more detail in the following with reference to FIGS. 2, 3, but the rest of the gas turbine which is otherwise identical in construction will not be described.

Figure 2:
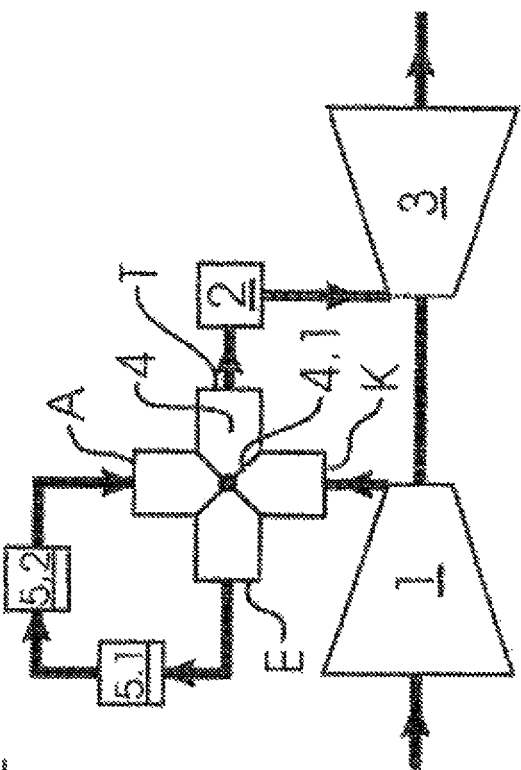
FIG. 2 is a switchable solar heating device according to an embodiment of the present invention for modification of the gas turbine from FIG. 1.

FIG. 2 shows a switchable solar heating device according to an embodiment of the present invention. This comprises a 4/2-way valve 4 with a compressor port K connected to the final compressor stage of the compressor 1, a turbine port T connected to the first turbine stage of the turbine 3, a solar input port E connected to an input of a solar heater 5.1, 5.2, and a solar output port A connected to an output of this solar heater. The four ports K, E, A and T all lie substantially in the drawing plane of FIG. 2 and, in this order, enclose an angle of 90° with one another, respectively.

A rotatable flap 4.1 is arranged in the interior of the valve 4 and can be adjusted to a first switching position shown in bold in FIG. 2 and to a second switching position indicated in dashes in FIG. 2 by an electric motor that can be controlled by a control device.

In the first switching position, the flap 4.1 closes off the compressor port K from the turbine port T and the solar input port E from the solar output port A so that the gas from the compressor 1 is guided in its entirety through the compressor port K and the solar input port E connected to or communicating with the latter into a first solar heater 5.1 of the solar heating device. The heat is subjected to solar heating in this first solar heater 5.1 and a subsequent second solar heater 5.2 of the solar heating device before flowing through the solar output port A and the turbine port T connected to or communicating with the latter into the external combustion chamber 2, where it is burned so that hot exhaust gas drives the gas turbine 3.

If the solar heating output of the solar heater 5.1, 5.2 is too low, which the control device can determine, for example, by comparing acquired temperatures at the solar input port E and solar output port A, the electric motor moves the flap 4.1 into the second switching position (in dashed lines in FIG. 2). Conversely, in this second switching position, the flap 4.1 of the valve 4 which accordingly functions as a slip switch closes off the compressor port K from the solar input port E and closes off the solar output port A from the turbine port T, while the compressor port K communicates with the turbine port T and the solar input port E and solar output port A communicate with each other. In this way, the gas from the compressor 1 is fed in its entirety directly to the combustion chamber 2, while the solar heater 5.1, 5.2 is bypassed. When switched, gas located in the solar heater 5.1, 5.2 flows back into the solar heater again in a now closed circuit through the solar output port A and solar input port E which are connected to one another, so that its heat, kinetic energy, and pressure energy is retained apart from friction losses and heat exchange losses. On the one hand, this reduces the loading of the valve 4, particularly the valve flap 4.1, when moving from the first switching position into the second switching position, since this gas need not be abruptly braked. On the other hand, this gas need not be as intensively heated and accelerated when switching back into the first switching position provided it has not yet been too much cooled or braked by losses. Further, the closed circuit of the solar heater 5.1, 5.2 allows a kind of storage of solar energy by heating the gas located in the circuit by the solar heaters 5.1, 5.2.

While the valve 4 in the embodiment shown in FIG. 2 is constructed as a 4/2-way valve has exactly two switching positions, a 4-way valve according to another embodiment described in the following with reference to FIGS. 3A, 3B makes it possible to move to a third switching position in addition. The valves in both embodiments are structurally similar in other respects. Therefore, only the differences compared to the construction described above will be described in the following, and reference is made to the preceding description in other respects.

Figure 3A:
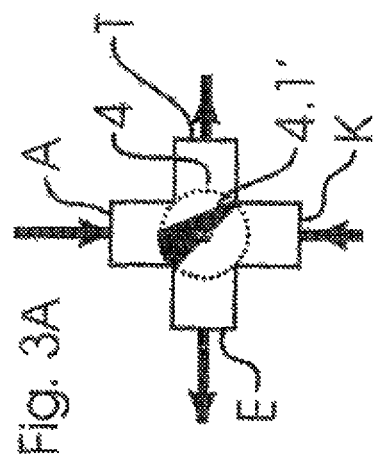
FIGS. 3A, 3B is a 4-way valve of a solar heating device according to another embodiment of the present invention.
Figure 3B:
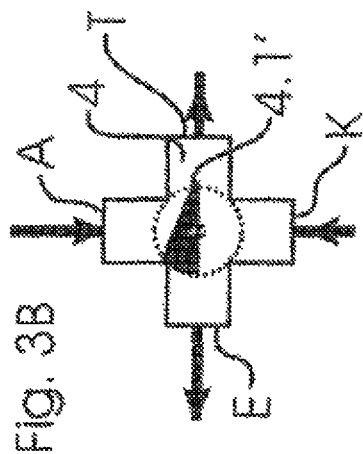

The flap 4.1' of the 4-way valve 4 in the further embodiment is constructed in the shape of a pie slice in such a way that the solar input port E is closed off from the solar output port A in the first switching position, shown in FIG. 3A, in a third switching position, shown in FIG. 3B, which occurs by a mathematically positive rotation of the flap 4.1' by 45°, and in every position located in between. On the other hand, when rotating further in a mathematically positive manner beyond the third switching position shown in FIG. 3B, particularly into a second switching position which is rotated 180 degrees in a mathematically positive manner relative to the first switching position shown in FIG. 3A, the solar input port E and solar output port A are connected.

In the first switching position (FIG. 3A), as was described above referring to FIG. 2, the flap 4.1' closes off the compressor port K from the turbine port T so that the gas from the compressor 1 is guided completely through the solar heater 5.1, 5.2. In the second switching position, as was described above, the flap 4.1' closes off the compressor port K from the solar input port E and closes off the solar output port A from the turbine port T so that the gas in its entirety is fed from the compressor 1 directly to the combustion chamber 2 and the solar heater 5.1, 5.2 is bypassed.

On the other hand, in the third switching position, shown in FIG. 3B, the compressor port K is connected to the solar input port E and also to the turbine port T, the latter communicating in turn with the solar output port A. Depending on the angular position of the flap 4.1' between 0° (FIG. 3A) and 45° (FIG. 3B) relative to the first position, the gas coming from the compressor 1 will accordingly flow partially into the solar heater 5.1, 5.2 or directly into the turbine port T. In this way, deliberately only a portion of the gas can be solar-heated in a mixed operation. In so doing, the hydraulic diameter of the compressor port, solar input port, solar output port and/or turbine port can be varied in a simple manner by rotating the flap 4.1' in order to vary the proportioning of the gas into solar-heated gas and gas that is fed directly to the turbine. In all of these third switching positions, the solar input port is closed off from the solar output port in order to prevent secondary flows inside the solar heater.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A switchable solar heating device for a gas turbine with a compressor, comprising:
   a valve configured to electively bypass a solar heater arranged between a compressor stage and a turbine stage of the gas turbine,
   wherein the valve is a 4-way valve having:
      a compressor port configured to be connected to the compressor stage;
      a turbine port configured to be connected to the turbine stage;
      a solar input port configured to be connected to an input of the solar heater;
      a solar output port configured to be connected to an output of the solar heater; and
      an adjustable flap rotatably arranged in the valve,
   wherein:
      in a first switching position the adjustable flap connects the compressor port to the solar input port and connects the solar output port to the turbine port and closes off the compressor port from the turbine port and closes off the solar input port from the solar output port,
      in a second switching position the adjustable flap connects the compressor port to the turbine port and at least one of closes off the compressor port from the solar input port and closes off the solar output port from the turbine port, and
      in a third switching position the adjustable flap connects the compressor port to the solar input port and to the turbine port, connects the solar output port to the turbine port, and closes off the solar input port from the solar output port.

2. The solar heating device according to claim 1, wherein the valve is constructed as a 4/2-way valve.

3. The solar heating device according to claim 2, wherein the compressor port and the turbine port form an angle of about 90° with respect to one another.

4. A gas turbine comprising:
   at least one compressor stage;
   at least one turbine stage; and
   a switchable solar heating device arranged between the turbine stage and the compressor stage, the switchable solar heating device comprising:
      a compressor port configured to be connected to the compressor stage;
      a turbine port configured to be connected to the turbine stage;
      a solar input port configured to be connected to an input of the solar heater;
      a solar output port configured to be connected to an output of the solar heater; and
      a control device configured to electively adjust the switchable solar heating device to a switching position,
   wherein:
      in a first switching position the switchable solar heating device connects the compressor port to the solar input port and connects the solar output port to the turbine port and closes off the compressor port from the turbine port and closes off the solar input port from the solar output port,
      in a second switching position the switchable solar heating device the compressor port to the turbine port and at least one of closes off the compressor port from the solar input port and closes off the solar output port from the turbine port, and
      in a third switching position the switchable solar heating device connects the compressor port to the solar input port and to the turbine port, connects the solar output port to the turbine port, and closes off the solar input port from the solar output port.

5. The gas turbine according to claim 4, wherein at least one external combustion chamber is arranged at least one of:
   between the compressor stage and the compressor port,
   between the solar input port and the solar output port, and
   between the turbine port and the turbine stage.

6. The gas turbine according claim 4, wherein at least one solar heater is arranged in at least one of:
   between the compressor stage and the compressor port,
   between the solar input port and the solar output port, and
   between the turbine port and the turbine stage.

7. The gas turbine according to claim 4, wherein exactly one valve is arranged between the compressor stage and the turbine stage for elective bypassing of the solar heater arranged between the compressor stage and turbine stage.

8. The gas turbine according to claim 7, wherein the valve is adjustable by the control device based at least in part on a heating output of the solar heater.

9. The solar heating device according to claim 7, wherein the valve is constructed as a 4/2-way valve.

10. The solar heating device according to claim 1, wherein the compressor port and the turbine port form an angle of about 90° with respect to one another.

11. The gas turbine according claim 5, wherein at least one solar heater is arranged in at least one of:
   between the compressor stage and the compressor port,
   between the solar input port and the solar output port, and
   between the turbine port and the turbine stage.

* * * * *